(12) United States Patent
Ognibene

(10) Patent No.: US 9,848,728 B2
(45) Date of Patent: Dec. 26, 2017

(54) MACHINE FOR PREPARING HOT BEVERAGES

(71) Applicant: OGNIBENE S.P.A., Reggio Emilia (RE) (IT)

(72) Inventor: Claudio Ognibene, Reggio Emilia (IT)

(73) Assignee: OGNIBENE S.P.A., Reggio Emilia (RE) (IT)

(*) Notice: Subject to any disclaimer, the term of this patent is extended or adjusted under 35 U.S.C. 154(b) by 83 days.

(21) Appl. No.: 15/085,053

(22) Filed: Mar. 30, 2016

(65) Prior Publication Data
US 2016/0296066 A1    Oct. 13, 2016

(30) Foreign Application Priority Data
Apr. 7, 2015   (IT) .............................. RE2015A0026

(51) Int. Cl.
| | |
|---|---|
| *A47J 31/00* | (2006.01) |
| *A47J 31/44* | (2006.01) |
| *A47J 31/40* | (2006.01) |
| *A47J 31/56* | (2006.01) |

(52) U.S. Cl.
CPC ........... *A47J 31/005* (2013.01); *A47J 31/407* (2013.01); *A47J 31/44* (2013.01); *A47J 31/56* (2013.01); *A47J 2201/00* (2013.01)

(58) Field of Classification Search
CPC ........ A47J 31/005; A47J 31/56; A47J 31/407; A47J 31/44
See application file for complete search history.

(56) References Cited

U.S. PATENT DOCUMENTS

2014/0305927 A1    10/2014    Alexander

FOREIGN PATENT DOCUMENTS

| | | |
|---|---|---|
| CN | 201987331 U | 9/2011 |
| DE | 202005003646 U1 | 5/2005 |
| FR | 2579880 A1 | 10/1986 |
| FR | 2758808 A1 | 7/1998 |

*Primary Examiner* — Erik Kashnikow
*Assistant Examiner* — Chaim Smith
(74) *Attorney, Agent, or Firm* — Volpe and Koenig, P.C.

(57) ABSTRACT

A machine for preparing hot beverages includes: a casing housing a water pump, heating means of the water, and an electronic control card able to command actuation of the pump and the water heating means; a body, connected to the casing, able to house a capsule containing a preparation for the beverage; in which the control card is connected to at least an inclination sensor able to measure an inclination of the casing of the machine with respect to a vertical, and is able to: receive from the inclination sensor a signal representing a measured inclination value of the casing; comparing the measured value with a predetermined value; actuating the pump when the measured value is greater than the predetermined value; stopping the pump when the measured value is smaller than or equal to the predetermined value.

12 Claims, 4 Drawing Sheets

MACHINE FOR PREPARING HOT BEVERAGES

FIELD OF THE INVENTION

The present invention relates to a machine for preparing hot beverages, such as coffee, tea or other infusions.

In particular the invention relates to a transportable machine for preparing hot beverages.

BACKGROUND

As is known, there are various types of machines for preparing coffee starting from capsules containing coffee powder.

These machines generally comprise a casing housing an electrically powered motor which actuates a pump that causes the pressurized water to flow through heating means of the water, for example constituted by a tube enveloped by electrical resistances, up to reaching a capsule containing ground coffee powder.

The pressurized water is introduced into the capsule through an end face of the capsule and the outlet of the beverage is obtained at an opposite end face of the capsule.

Machines of this type include, internally of the casing thereof, a tank that can be filled with water by the user according to needs.

Also known are transportable machines for preparing hot beverages having modest dimensions so as to enable use thereof during travelling or in any case when in a location outside the home.

However, transportable machines for preparing hot beverages of known type comprise a switch for activating the machine.

Consequently, for preparing the beverage, the user must hold the machine so as to arrange the outlet nozzle of the beverage in proximity of a recipient, for example a coffee cup, and at the same time activate the switch of the machine.

However, if a rest plane for the recipient is not available, the user must simultaneously support both the machine and the recipient for the beverage, and, at the same time, operate the switch, and more in general the use of the machine is particularly complex and laborious.

Consequently, the activation of the switch, and more in general the use of the machine, is particularly complex and laborious.

Further, the switches of the transportable machines of known type are configured for enabling the dispensing of a fixed quantity of beverage.

Consequently, the user cannot regulate as desired the quantity of beverage to be dispensed to his/her own personal taste.

An aim of the present invention is to obviate the above-mentioned drawbacks of the prior art, with a solution that is simple, rational and relatively inexpensive.

The aims are attained by the characteristics of the invention as reported in the independent claim. The dependent claims delineate preferred and/or particularly advantageous aspects of the invention.

SUMMARY

An embodiment of the invention, in particular, discloses a machine for preparing hot drinks, comprising: a casing housing a water pump and heating means of the water, and an electronic control card able to command actuation of the pump and the heating means; a body, connected to the casing, able to house a capsule containing a preparation for the beverage.

In the invention, the control card is connected to at least an inclination sensor able to measure an inclination of the casing of the machine with respect to a vertical, and is able to: receive from the inclination sensor a signal representing a measured inclination value of the casing; compare the measured value with a predetermined value; actuate the beverage dispensing means when the measured value is greater than the predetermined value; stop the beverage dispensing means when the measured value is smaller than or equal to the predetermined value (Y).

With this solution, the dispensing of the beverage is directly commandable by the user by means of the inclining of the casing, effective and easy to use.

Further, with this solution the user can determine as de-sired the quantity of hot beverage dispensed, interrupting the activity of the machine simple by inclining the casing beyond a predetermined inclination value.

The predetermined value (Y) is advantageously comprised between 90° and 100°.

In this way, the dispensing begins when the casing has reached a sufficient value to enable the beverage to flow correctly from the capsule to a recipient specially predisposed by the user.

In a further aspect of the invention, the predetermined value is 90°.

This solution in fact guarantees that the dispensing of the beverage starts when the casing has reached a sufficient inclination to enable a user to appropriately direct the flow of the beverage towards a recipient.

In a further aspect of the invention, the control card is configured so as to actuate the water heating means simultaneously with the pump.

In this way, the inclination sensor and the control board are sufficient to command dispensing of the beverage and as no further command devices are necessary, such as for example switches, the machine is simple and easy to use.

In a further aspect of the invention, the heating means are actuated independently of the pump.

With this solution, the heating means can be activated independently of the pump and the inclination of the machine so as to avail of a machine that is already at the desired temperature when the user inclines the machine so as to activate dispensing of the beverage.

Further, in this way, once the dispensing of a first drink has terminated, the machine can remain at a right temperature for enabling preparation of a further beverage.

The machine advantageously comprises a switch associated to the casing, connected to the control board and able to activate the water heating means.

In this way, the water heating means can be activated by a simple command element that is economical to realize.

The inclination sensor advantageously comprises an accelerometer and/or an inclinometer and/or a gyroscope.

An advantage of this embodiment is that the measurement of the inclination is attained by means of one or more economical and easily-realizable sensors, which guarantee an accurate measurement of the inclination, enabling an effective control of the machine.

In a further aspect of the invention, the control card is connected to a wireless communication module.

In this way, it is possible to connect the machine to external devices, such as a smartphone containing applications able to remotely control the functioning of the machine.

The casing advantageously houses at least a battery connectable to a battery charger.

An advantage of this embodiment is that it enables autonomous electrical supply to the machine, especially suitable in a case in which the machine is used while travelling.

In a further aspect of the invention, the casing exhibits a seating enabling removable connection of a water tank.

An advantage of this embodiment is that the machine has modest dimensions and can be transported even to places away from the domestic ambient.

The tank is advantageously constituted by a bottle.

In this way the machine can be utilised, using as a water tank a component that is easy to obtain, i.e. a polyethylene terephthalate bottle (PET) or bottles made of other materials for food use.

BRIEF DESCRIPTION OF THE DRAWINGS

Further characteristics and advantages of the invention will emerge from a reading of the following description, provided by way of non-limiting example with the aid of the figures illustrated in the appended tables of drawings.

DETAILED DESCRIPTION OF THE PREFERRED EMBODIMENTS

With particular reference to the appended figures, the machine 10 will be described for the sake of simplicity with reference to the coffee preparation, without excluding the possibility for it to be adapted to preparation of other hot beverages, such as tea or other infusions.

The machine 10 for preparation of coffee comprises a casing 15, for example having a substantially cylindrical shape, provided with a longitudinal axis A and a first and a second opening 60, 75, for example circular, made at the opposite longitudinal ends of the casing 15.

The first opening 60 is able to function as an inlet for water, necessary for preparation of the beverage, internally of the casing 15, while the second opening 75 is able to function as an outlet for the water from the casing 15.

Figure 3:
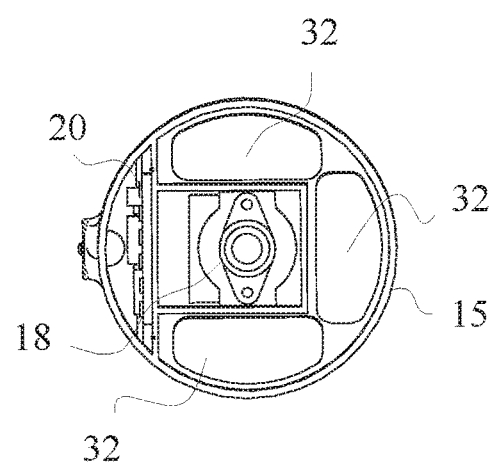
FIG. 3 is a section view along plane C-C of the machine of claim 2.

The casing 15 internally houses an electrical motor 22 for activating a pump 18 for placing the water under pressure. (FIG. 3).

The pump 18 is arranged in a proximal position to the first opening 60 and in particular it is hydraulically connected to the first opening 60.

Figure 4:
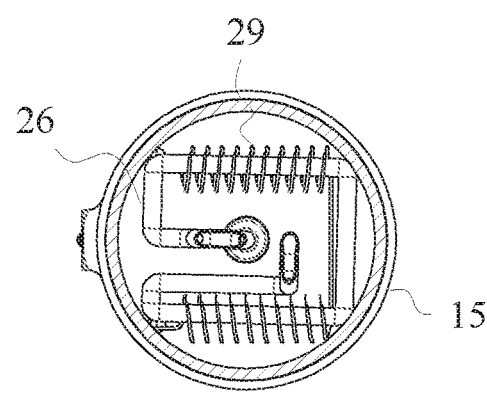
FIG. 4 is a section view along plane E-E of the machine of claim 2.

The casing 15 further houses a tube 26 for the pressurized water hydraulically connected at an end to the delivery of the pump 18, and at the other end to the first opening 75, and heating means of the water which can comprise one or more electrical resistances 29, enveloped about the tube 26. (FIG. 4).

A check valve 14 and an overpressure valve 24 are also included internally of the casing 15.

The casing 15 is further able to house a battery 32 for powering the motor 22 and the electrical resistances 29.

In turn the battery 32 can be connected to a battery charger 30 for enabling recharging, availing of an input 48 fashioned in the casing 15 of the machine 10.

The machine 10 is provided with a water tank 12 associated externally to the casing 15 at an appropriate seating defined by the first opening 60, which is provided with connecting means to the tank 12.

In particular the tank 12 is set in fluid communication with the inside of the casing 15 by means of the first opening 60.

In the embodiment illustrated in the figures, the water tank external of the casing 15 can be constituted, for example, by a plastic bottle 12, for example made of polyethylene terephthalate (PET) containing water.

As is known, these bottles include a neck 85 provided with a male threading 17, able to engage with a corresponding female threading of a cap (not illustrated for the sake of simplicity) and, in a lower position to the neck 85, have a projecting collar 19 which separates the neck 85 from the rest of the bottle 12.

In particular, the connecting means with the bottle 12 can include a female threading, fashioned internally of the first opening 60 and able to receive the male threading 17 of the neck 85 of the bottle 12.

Alternatively other connecting means can be included between the bottle 12 and the first opening 60 of the machine 10.

For example, a sleeve made of an elastic material (not illustrated) such as natural or artificial rubber could be included, having a slightly smaller diameter than the neck 85 of the bottle 12 and which enables a friction coupling of the neck 85 of the bottle 12 with the first opening 60.

Alternatively a connecting device (not illustrated) can be included at the first opening 60, provided with an external washer that can be rotated so as to squeeze onto the neck 85 of the bottle 12 a female element belonging to the first opening 60.

The machine 10 further comprises a body 80 for housing a capsule 28, containing coffee in powder form or another preparation for hot drinks, associable to the casing 15 at a suitable seating define by the second opening 75.

The body 80 can be set in fluid communication with the inside of the casing 15 by means of the second opening 75.

Figure 6:
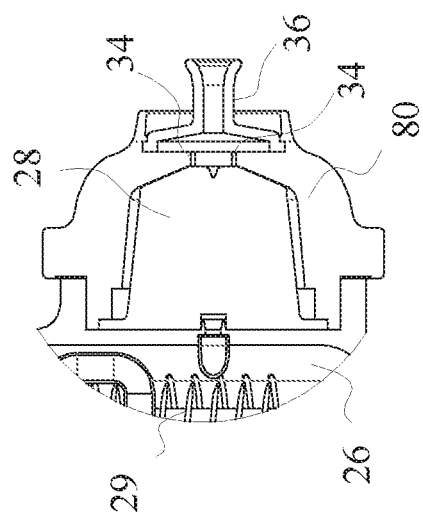
FIG. 6 is a detail of the machine of claim 5.
Figure 5:
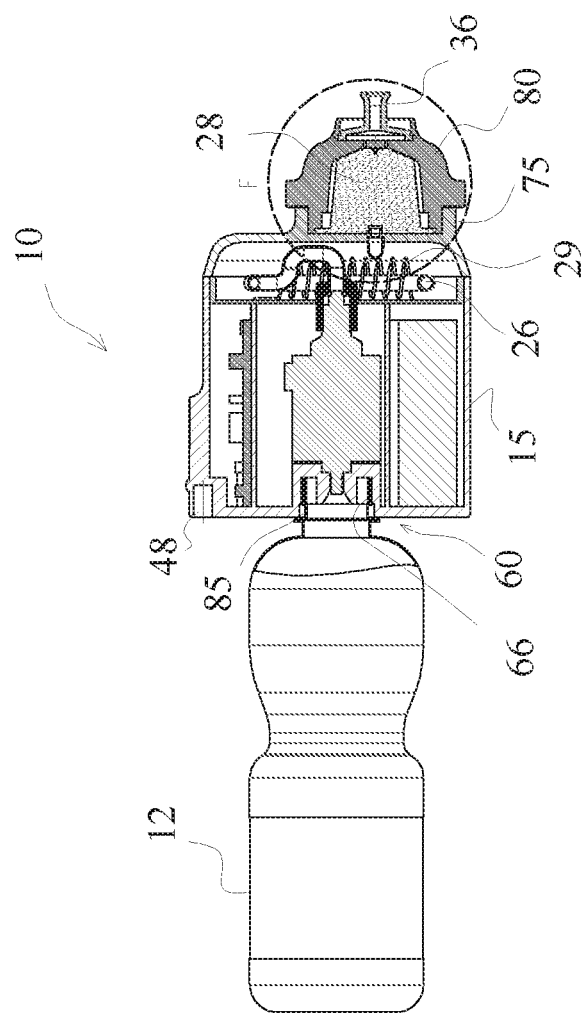
FIG. 5 is a section view along a longitudinal plan of the machine, in an embodiment of the invention.

In particular the body 80 can be connected to the casing 15 of the machine 10 by screwing or by other connecting means of known type which enable the coupling with the second opening 75 of the casing 15 (FIGS. 5 and 6).

The body 80 also exhibits a series of orifices 34, located downstream of the capsule 28 and which enable, when the machine is 10 operating, exit of coffee towards a nozzle 36 and then into a cup 90.

Figure 1:
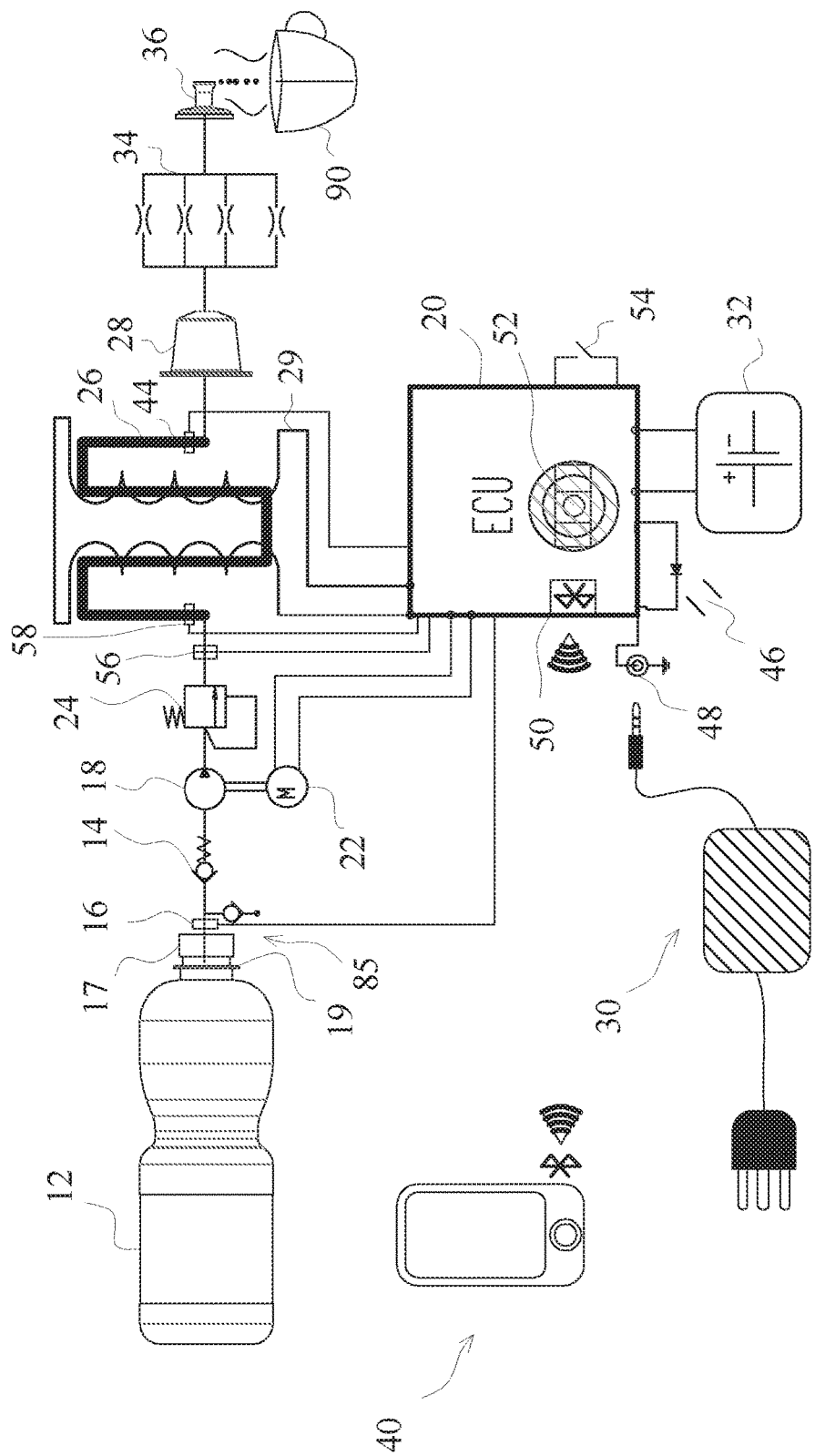
FIG. 1 is a schematic view of the components of the ma-chine, in a preferred embodiment of the invention.

With reference to FIG. 1, note that the machine 10 also has, internally of the casing 15, an electronic control card 20 connected to various devices of the machine 10 and able, in particular, to command activation of the motor 22 and the electrical resistances 29 for heating the water.

Further, the control card 20 is connected to at least an inclination sensor 52, also contained in the casing 15, which measures an inclination of the casing 15 of the machine 10 with respect to a vertical, denoted by V in figures from 7 to 9.

In particular, the inclination sensor 52 can measure the angle of inclination θ of the longitudinal axis A of the casing 15 with respect to a vertical axis V.

Figure 7:
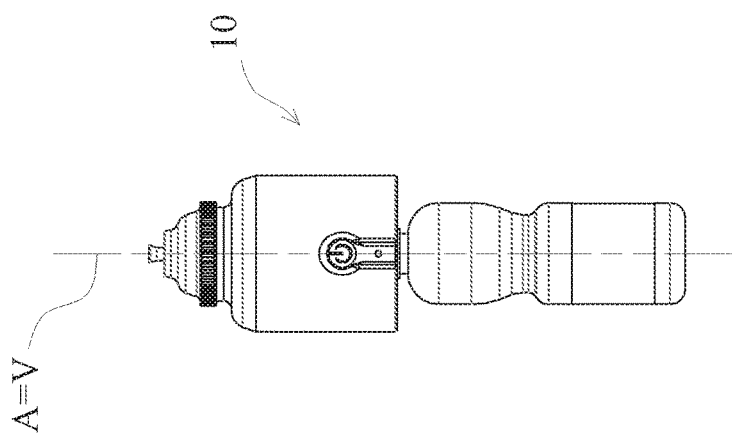
FIG. 7 is a frontal view of the machine, in a first operating configuration.

In the preferred embodiment, the measured value θ of the angle of inclination is nil (0°) when the longitudinal axis A of the casing 15 is parallel to the vertical axis V and the machine 10 is arranged with the tank 12 downwards and the nozzle 36 upwards (see FIG. 7).

Figure 8:
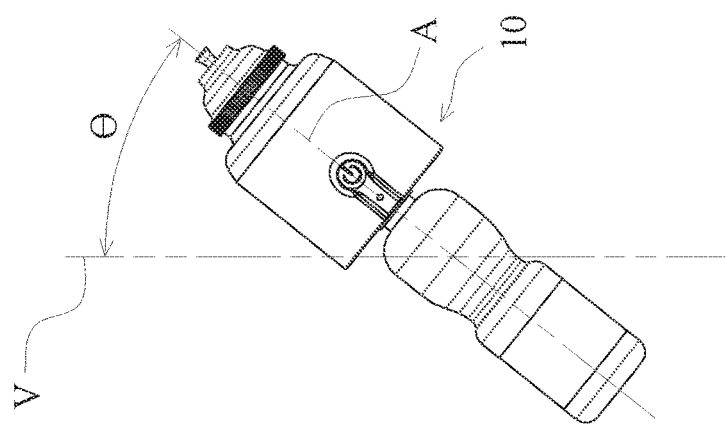
FIG. 8 is a frontal view of the machine, in a second operating configuration.

By inclining the machine 10 the measured value θ of the angle of inclination of the longitudinal axis A increases (see FIG. 8).

Figure 9:
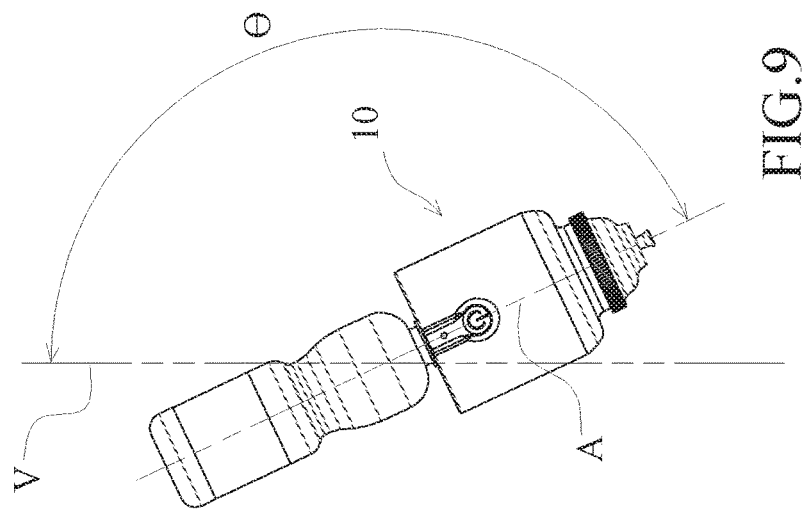
FIG. 9 is a frontal view of the machine, in a third operating configuration.

When the machine 10 is arranged with the tank 12 upwards and the nozzle 36 downwards, the measured value θ of the angle of inclination is greater than 90° (see FIG. 9).

In particular, when the longitudinal axis A of the casing 15 is parallel to the vertical axis V, but the machine 10 is arranged with the nozzle 36 downwards, the measured value θ of the angle of inclination is 180°.

The inclination sensor 52 is further able to send a signal representing the measured inclination value (θ) of the control card (20).

The control card 20 is able to receive in input the signal sent by the inclination sensor 52 and to compare the measured value θ with a predetermined angle of inclination Y.

When the control card 20 detects that the measured value θ is greater than the predetermined value Y it activates the current flow to the electrical resistances 29, so as to bring the water to the temperature and pressure conditions required for infusing the beverage and, at the same time, it activates the motor 22 (and consequently the pump 18), enabling dispensing of the beverage.

When the control card 20 detects that the measured value θ is at the predetermined value Y it commands the halting of the dispensing of the beverage and, in particular, commands the halting of the motor 22 and of the electrical current flow internally of the electrical resistances 29.

The predetermined value (Y) is for example advantageously comprised between 90° and 100°, and is preferably 90°.

In this way, the predetermined value Y corresponds to an inclination close to the vertical in which the machine 10 is orientated with the tank 12 facing upwards and the body 80 facing downwards, so as to enable the water to flow by gravity from the tank 12 to the casing 15 and to the beverage from the nozzle 36 to the cup 90.

Consequently the control card 20 enables the dispensing of the beverage when the water is free to flow by gravity from the tank 12 to the casing 15 and the nozzle 36 can be advantageously directed towards the cup 90.

The inclination sensor 52 can be constituted, for example, by an accelerometer, an inclinometer, a gyroscope or by a combination of these elements.

Alternatively, in a further embodiment, the machine can comprise a switch 54, associated to the external wall of the casing 15, for activating the machine 10.

In particular, the switch 54 is connected to the control card 20 so as to command, for example, the activating of the current flow internally of the electrical resistances 29, wound about the tube 26, to heat the water with the aim of bringing it to a sufficient temperature for preparation of the beverage.

In this embodiment, when the control card 20 detects that the measured value θ is greater than the predetermined value Y it activates only the motor 22 (and consequently the pump 18) so as to increase the pressure of the water, which crosses the tube 26, previously heated by the electrical resistances 29.

Still with reference to this embodiment, when the control card 20 detects that the measured value θ is at the predetermined value Y it commands the halting of the dispensing of the beverage and, in particular, commands the halting of the motor 22, while the electrical resistances 29 can be maintained at the temperature so as to make the machine 10 available for preparation of a following beverage.

The control card 20 is also connected to a flow sensor 16 which detects the water flow in entry and a pressure sensor 56 of the water internally of the heating circuit; the control card 20 is also connected to a water temperature sensor 44.

The data in arrival from these sensors can therefore be processed so as to manage the functioning times of the machine 10.

Lastly the control card 20 can also include a wireless module 50 for communication with other electronic devices, for example a Bluetooth or Wi-Fi module.

By means of the Bluetooth module 50, the control card 20 can communicate, for example, with a smartphone 40 (FIG. 1), which can be provided with an application that enables remote control of the machine 10 for various coffee preparation programs (or other drinks).

Figure 2:
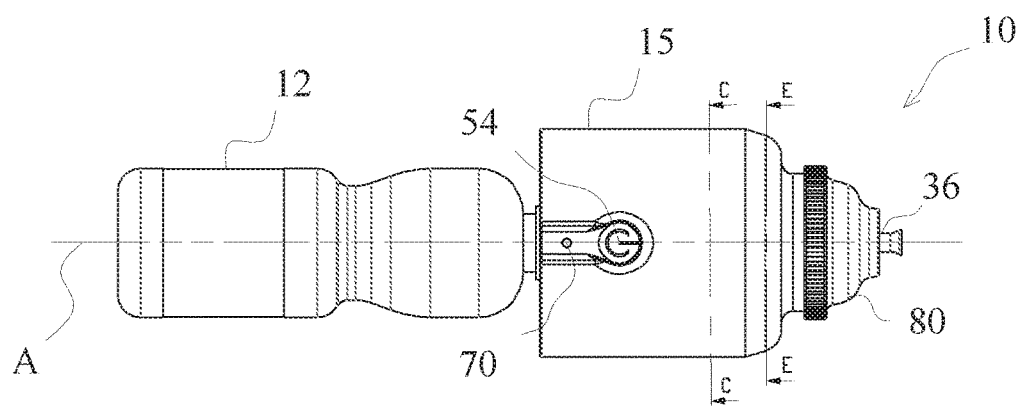
FIG. 2 is a lateral view of the components of the machine, in a preferred embodiment of the invention.

Lastly one or more LEDs 70 can be included on the casing 15 of the machine 10, which LEDs 70 indicate the operating status (FIG. 2).

For example, the LEDs 70 can indicate reaching the desired temperature in the electrical resistance 29.

During machine operation 10 the tank 12 can be connected, for example the bottle 12, to the casing 15, for example by maintaining the bottle 12 substantially vertical with the neck 85 thereof upwards and by screwing the bottle 12 internally of the first opening 60 included in the casing 15 of the machine 10.

In the same way, the body 80 housing the capsule 28 containing ground coffee powder can be connected to the machine 10.

As previously mentioned, in order to activate the machine 10 and dispense the beverage, it is sufficient to incline the machine 10 so as to position the tank 12 upwards and the nozzle 36 downwards in proximity of the cup 90.

When the control card 20 of the machine 10 detects that the machine 10 is in the correct position for operation thereof, i.e. the measured value θ is greater than the predetermined value Y, consent is given to the machine members for preparation of the coffee, i.e. the motor 22 is started and the pump 18 connected thereto thus brings the water to pressure through the tube and, further, the control card 20 activates the heating of the water via the electrical resistance 29.

The pressurized water is introduced into the capsule 28 through one of the end faces of the capsule and the outlet of the beverage is achieved at an opposite end face of the capsule 28.

The beverage then proceeds through the orifices 34 located downstream of the capsule 28, and is directed towards the outlet nozzle 36.

As long as the control card 20, via the inclination sensor 52, detects a measured value θ of greater than the predetermined value Y, the machine 10 continues dispensing the beverage.

When the machine has dispensed a sufficient quantity of beverage, according to the user's preferences, the machine is inclined so as to increase the inclination of the longitudinal axis of the casing 15 with respect to the vertical.

When the control card 20 of the machine detects that the measured value θ is at the predetermined value Y it halts the machine 10 members for preparing the coffee, i.e. it halts the motor 22 and interrupts the electrical current flow towards the electrical resistances 29.

The machine 10 can also be managed remotely using the smartphone 40, for example for monitoring and controlling the operating conditions of the machine, or for remotely activating the electrical current flow in the electrical resistances 29 so as to maintain them at the desired temperature independently of the inclination measured by the inclination sensor 52.

The invention as it is conceived is susceptible to numerous modifications, all falling within the scope of the inventive concept.

Further, all the details can be replaced with other technically-equivalent elements.

In practice the materials used, as well as the contingent shapes and dimensions, can be any according to requirements, without forsaking the scope of protection of the following claims.

The invention claimed is:

1. A machine (10) for preparing hot beverages comprising:
    a casing (15) housing a water pump (18), heating means (29) of the water, and an electronic control card (20) able to command actuation of the pump (18) and the water heating means (29);
    a body (80), connected to the casing (15), able to house a capsule (28) containing a preparation for the beverage;
    wherein the control card (20) is connected to at least an inclination sensor (52) able to measure an inclination of the casing (15) of the machine (10) with respect to a vertical, and is able to:
        receive from the inclination sensor a signal representing a measured inclination value (θ) of the casing (15);
        compare the measured value (θ) with a predetermined value (Y);
        actuate the pump (18) when the measured value (θ) is greater than the predetermined value (Y);
        stop the pump (18) when the measured value (θ) is smaller than or equal to the predetermined value (Y).

2. The machine of claim 1, wherein the predetermined value (Y) is between 90° and 100°.

3. The machine (10) of claim 2, wherein the predetermined value (Y) is 90°.

4. The machine (10) of claim 1, wherein the control card (20) is configured so as to actuate the water heating means (29) simultaneously with the pump (18).

5. The machine (10) of claim 1, wherein the heating means (29) are actuated independently of the pump (18).

6. The machine of claim 5, further comprising a switch (54) associated to the casing (15) and connected to the control card (20) able to actuate the water heating means (29).

7. The machine (10) of claim 1, wherein the inclination sensor (52) comprises at least one of: an accelerometer; an inclinometer or a gyroscope.

8. The machine (10) of claim 1, wherein the control card (20) is connected to a wireless communication module (50) for connecting to a remote control device.

9. The machine (10) of claim 1, wherein the casing (15) houses at least a battery (32).

10. The machine (10) of claim 1, wherein the casing (15) comprises a seating (60) enabling removable connection of a water tank.

11. The machine (10) of claim 10, wherein the tank is constituted by a bottle (12).

12. A method for preparing hot beverages which comprises steps of:
    providing a machine (10) according to claim 1;
    providing the capsule (28) in the body (80);
    inclining the casing (15) of the machine (10) with respect to a vertical;
    measuring a value (θ) of inclination of the casing (15) with respect to the vertical;
    sending a signal to the control card (20) representing the measured inclination value (θ) of the casing (15);
    comparing the measured value (θ) with a predetermined value (Y);
    actuating the pump (18) when the measured value (θ) is greater than the predetermined value (Y);
    stopping the pump (18) when the measured value (θ) is smaller than or equal to the predetermined value (Y).

* * * * *